(12) United States Patent
Kaushik et al.

(10) Patent No.: US 10,727,683 B2
(45) Date of Patent: Jul. 28, 2020

(54) WIRELESS CHARGING OF MULTIPLE WIRELESS DEVICES USING RF (RADIO FREQUENCY) ENGERGY

(71) Applicant: Fortinet, Inc., Sunnyvale, CA (US)

(72) Inventors: Anil Kaushik, Bangalore (IN); Teodoro Fornoles, Jr., San Ramon, CA (US)

(73) Assignee: Fortinet, Inc., Sunnyvale, CA (US)

( * ) Notice: Subject to any disclaimer, the term of this patent is extended or adjusted under 35 U.S.C. 154(b) by 57 days.

(21) Appl. No.: 15/396,657

(22) Filed: Dec. 31, 2016

(65) Prior Publication Data

US 2018/0191191 A1   Jul. 5, 2018

(51) Int. Cl.

| | |
|---|---|
| *H02J 7/02* | (2016.01) |
| *H04B 7/0452* | (2017.01) |
| *H04B 7/06* | (2006.01) |
| *H04B 5/00* | (2006.01) |
| *H02J 50/20* | (2016.01) |
| *H02J 50/40* | (2016.01) |
| *H02J 50/80* | (2016.01) |
| *H04W 84/12* | (2009.01) |
| *H04W 88/08* | (2009.01) |

(52) U.S. Cl.
CPC ............. *H02J 7/025* (2013.01); *H02J 50/20* (2016.02); *H02J 50/40* (2016.02); *H02J 50/80* (2016.02); *H04B 5/0037* (2013.01); *H04B 7/0452* (2013.01); *H04B 7/0617* (2013.01); *H04W 84/12* (2013.01); *H04W 88/08* (2013.01); *Y02D 70/10* (2018.01); *Y02D 70/14* (2018.01); *Y02D 70/142* (2018.01); *Y02D 70/144* (2018.01); *Y02D 70/166* (2018.01)

(58) Field of Classification Search
CPC ............. H02J 50/20; H02J 50/40; H02J 50/80
USPC ........................................................ 320/108
See application file for complete search history.

(56) References Cited

U.S. PATENT DOCUMENTS

| | | | |
|---|---|---|---|
| 9,185,662 B2 * | 11/2015 | Rajakarunanayake | H04W 52/265 |
| 9,730,082 B2 * | 8/2017 | Park | H04W 16/26 |
| 9,961,483 B1 * | 5/2018 | Berchanskiy | H04W 4/008 |
| 2013/0210347 A1 * | 8/2013 | Ling | H04W 4/80 455/41.1 |
| 2015/0229133 A1 * | 8/2015 | Reynolds | H04W 52/281 307/24 |
| 2015/0303741 A1 * | 10/2015 | Malik | H04B 5/0037 307/104 |

* cited by examiner

*Primary Examiner* — David V Henze-Gongola
*Assistant Examiner* — Tarikh Kanem Rankine
(74) *Attorney, Agent, or Firm* — Law Office of Dorian Cartwright; Dorian Cartwright

(57) ABSTRACT

RF (radio frequency) charging access points charge IoT (Internet of things) devices. RF charging service is advertised through periodically broadcast beacons. A MU-MIMO group or other group is formed from a plurality of stations connected to the access point for RF charging. RF packets are transmitted to stations in the MU-MIMO group, each station including RF charging circuitry to harvest reusable energy from the RF packets.

10 Claims, 5 Drawing Sheets

WIRELESS CHARGING OF MULTIPLE WIRELESS DEVICES USING RF (RADIO FREQUENCY) ENGERGY

FIELD OF THE INVENTION

The invention relates generally to computer networking, and more specifically, to wireless charging of multiple wireless devices using RF (radio frequency) energy.

BACKGROUND

IoT (Internet of Things) devices such as sensors, smart appliances and even shoes are burdening networks along with conventional devices such as smart phones and tablet computing devices. Many IoT devices are enabled by RF tags or other mobile components that are powered by a battery. Low cost RF tags are simply thrown away at the end of life, but disposal requires manual labor and causes downtime.

What is needed is a robust technique to group IoT devices for wireless charging IoT using RF, induction, or other techniques.

SUMMARY

These shortcomings are addressed by the present disclosure of methods, computer program products, and systems for wirelessly charging groups of IoT devices and other devices.

In one embodiment, RF charging service is advertised through periodically broadcast beacons. A MU-MIMO group or other group is formed from a plurality of stations connected to the access point for RF charging. RF packets are transmitted to stations in the MU-MIMO group, each station including RF charging circuitry to harvest reusable energy from the RF packets.

Advantageously, IoT devices with lower power usage can be recharged without being manually changed and without downtime.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for wirelessly charging IoT devices. Charging via RF is discussed throughout, but other techniques such as induction, and later developed techniques are considered within the scope of the present disclosure. One of ordinary skill in the art will recognize many additional variations made possible by the succinct description of techniques below.

I. Systems to Wirelessly Charge IoT Devices (FIG. 1-4)

Figure 1:
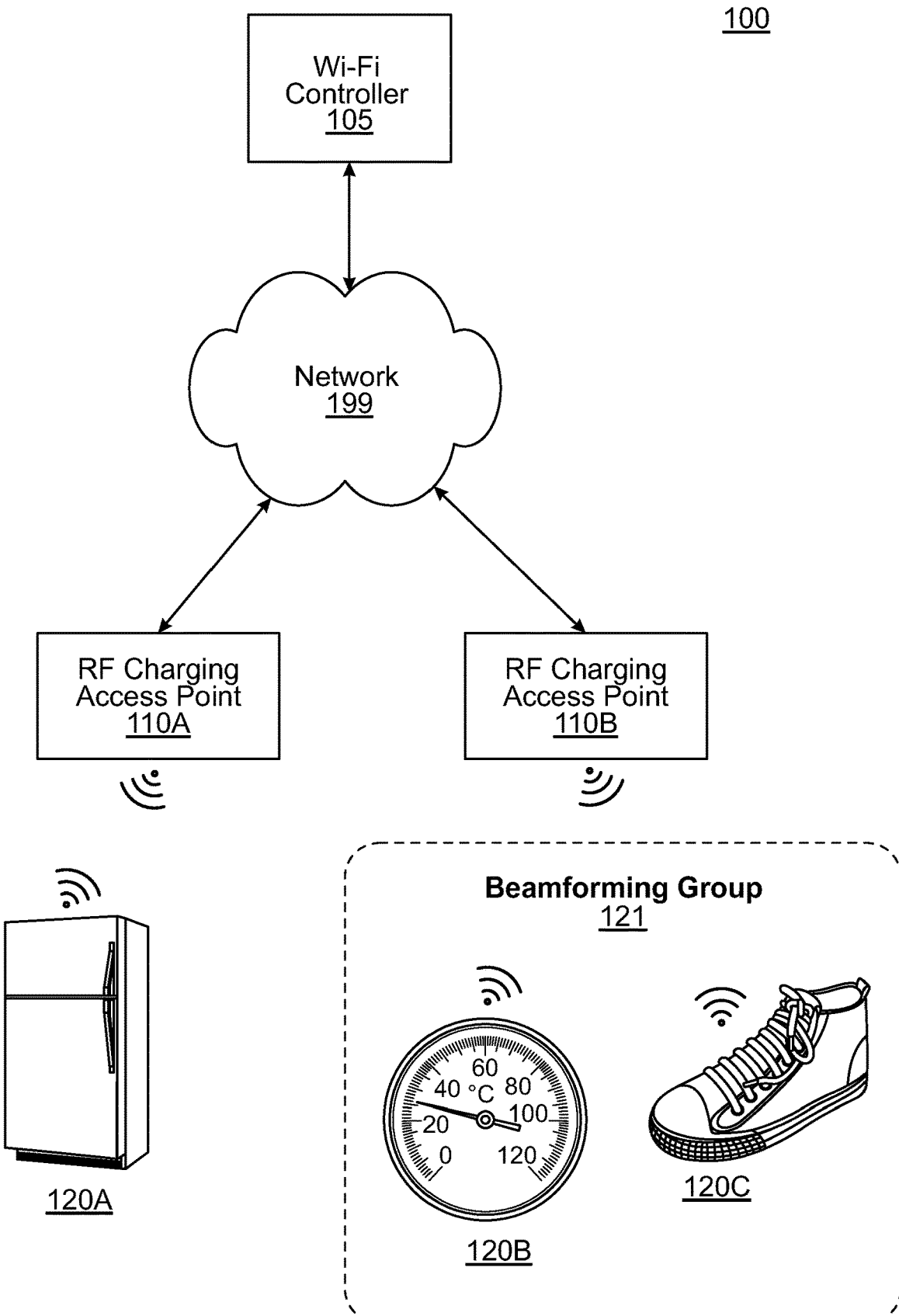
FIG. 1 is a high-level block diagram illustrating a system to wirelessly charge IoT devices, according to one embodiment.

FIG. 1 is a high-level block diagram illustrating a system 100 to wirelessly charge IoT devices, according to one embodiment. The system 100 comprises a Wi-Fi controller 105, RF charging access points 110A-B, and IoT devices 120A-C. Other embodiments are possible.

The RF charging access points 110A-B (generically referred to as access point 110), in an embodiment, form groups for efficiently charging IoT devices 120A-C. In one embodiment, the access point 110 is dedicated to charging. In another embodiment, the access point 110 changes modes between data transfers and RF charging, for example, as directed by the Wi-Fi controller 105. In still another embodiment, one or more of several radios are dedicated to RF charging. In yet another embodiment, a BSSID (basic service set identifier) can be dedicated for RF charging.

The access point 110 can reconfigure when RF charging. Beamforming can be implemented for more efficient charging of a group. In one case, a group consists of one IoT device to which RF energy is beamformed for maximum effect. Lower frequencies can be used for IoT devices that are locate further away, especially since data integrity is not of issue.

Some embodiments group stations according to MU-MIMO (multiple user-multiple input multiple output) groups. For example, beamforming group 121 includes IoT devices 120B, 120C which can belong to the same owner, have similar power requirements, or be closely located. Groups can also be formed according to RSSI strength from a particular access point 110.

In other operations, the access point manages connections of stations from a Wi-Fi channel by advertising through periodic beacons, and associating SSIDs with stations. Additional embodiments of the RF charging access point 110 are described below in association with FIG. 2.

IoT devices 120A-C (generically referred to as 120) comprise physical devices or non-computerized devices that are present on the network through a network card, RF tag, or other mechanism, in some cases. Here, a refrigerator 120A, a temperature sensor 120B and a shoe 120C are all present. The presence can be direct with a communication device, or indirect when scanned and reported by a conventional network device. In other cases, the IoT device 120 refers to a computerized device that conventionally connects to the network, such as a smartphone or laptop computer. One embodiment uses an RF circuit to harvest RF energy for use by a different communication channel, such as a Bluetooth Low Energy radio.

Figure 6:
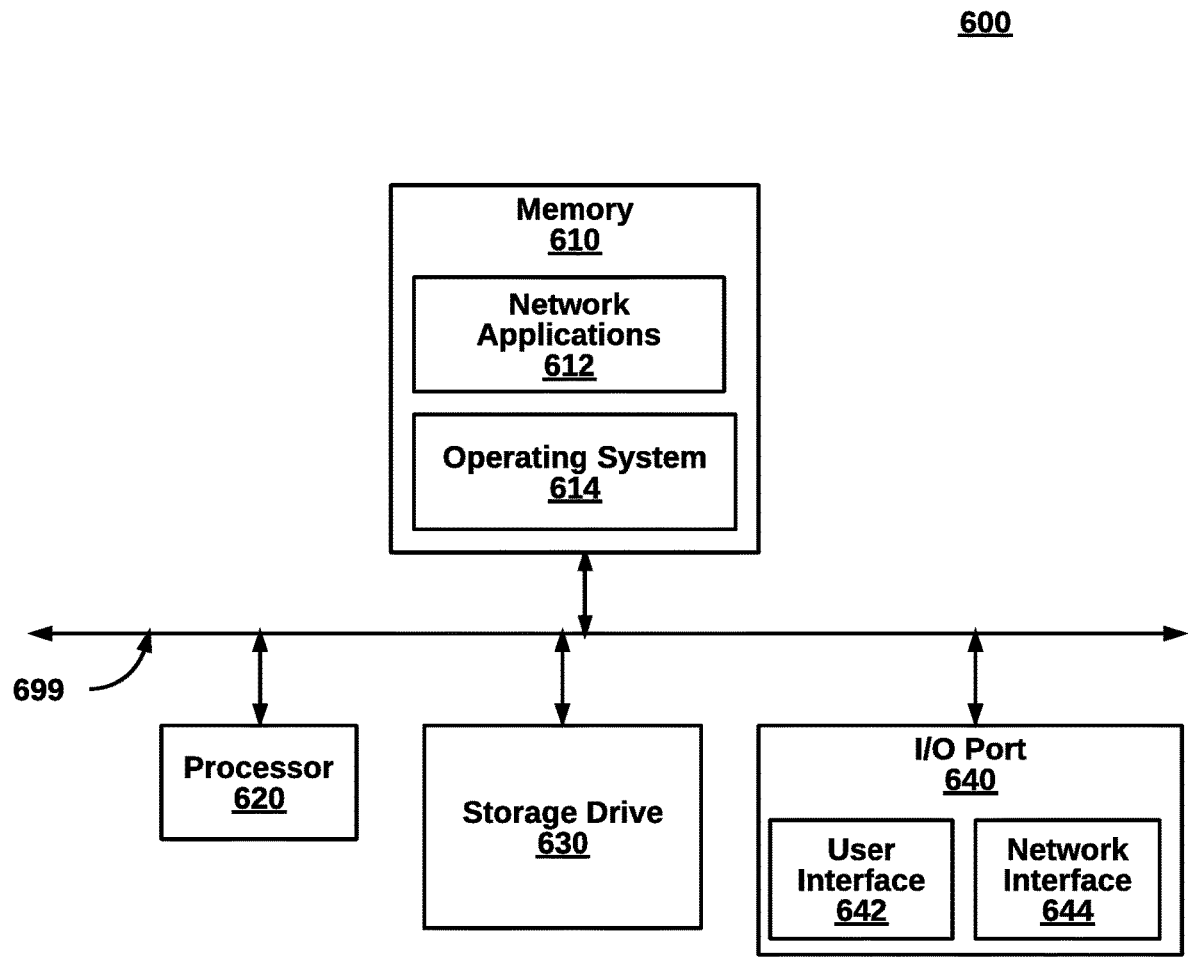
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The stations 130A-D are coupled by Wi-Fi connection to the access point 110 which in turn is connected to the network 199 (i.e., to network backbone components therein), preferably through a wired connection. The IoT devices 120 are connected to high throughput channels while the IoT devices 120 are connected to low throughput channels. Finally, the Wi-Fi controller 105 is also connected to the network 199, preferably through a wired connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE (Institute of Electrical and Electronics Engineers) 802.11 protocols, including IEEE 802.11n and IEEE 802.11ac.

Figure 2:
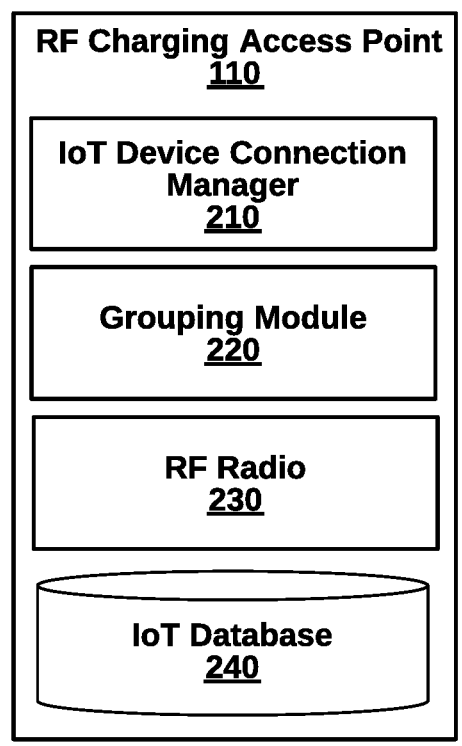
FIG. 2 is a more detailed block diagrams illustrating an RF charging access point and an IoT device of the system of FIG. 1, respectively, according to some embodiments.

FIG. 2 is a more detailed block diagrams illustrating an RF charging access point and an IoT device of the system of FIG. 1, respectively, according to some embodiments. The access point 110 comprises an IoT device connection manager 210, a grouping module 220, an RF radio 230, and an IoT database 240. The components can be implemented in hardware, software, or a combination of both.

The IoT device connection manager 210 oversees wireless IoT devices and other station connections. A beacon generator (not shown) advertises services. A BSSID table stores BSSID assignments to wireless stations. A hand-off module (not shown) can facilitate fast hand-offs to and from neighboring access points. The IoT database 240 stores characteristics of IoT devices.

The grouping module 220 can group charging stations using MU-MIMO groups or other grouping algorithms. For example, IoT devices can be grouped based on power level, location, type, owner, or other characteristics.

The RF radio 230 transmits packets using RF energy. Some embodiments use beamforming to direct energy transmissions to a certain area rather than radially.

Figure 3:
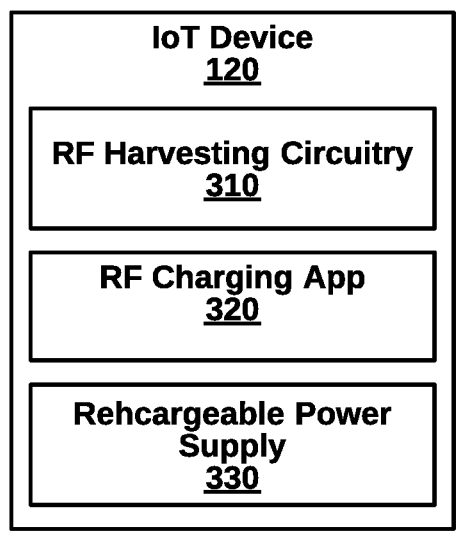
FIG. 3 is a more detailed block diagrams illustrating a rechargeable IoT device of the system of FIG. 1, respectively, according to some embodiments.

FIG. 3 is a more detailed block diagrams illustrating an IoT 120 device of the system of FIG. 1, according to an embodiment. The IoT device 120 comprises RF harvesting circuitry 310, an RF charging app 320, and a rechargeable power supply 330. The components can be implemented in hardware, software, or a combination of both.

Figure 4:
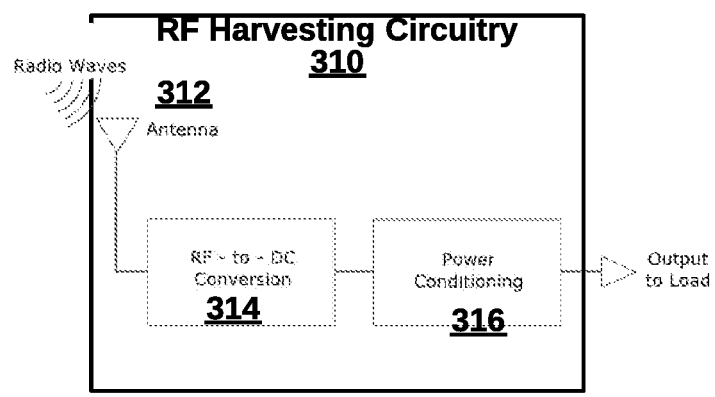
FIG. 4 is a more detailed block diagrams illustrating RF harvesting circuitry of the rechargeable IoT device of FIG. 3, respectively, according to some embodiments.

The RF harvesting circuitry 310 converts RF energy to DC energy stored in the rechargeable power supply 330. One specific example is illustrated in FIG. 4. There, an antenna 312 receives radio waves sent out by an RF charging access point. The antenna can be a 50-ohm antenna, for instance. The RF to DC conversion 314 converts the RF energy to a DC form of energy that can be stored. The power conditioning 316 can include an inductor or other type of signal smoothing circuitry.

The RF charging app 320 provides application layer communication with a charging service of the access point 110. As such, power level of the IoT device 120 can be monitored, as well as other characteristics, such as charging schedule, battery size, and the like.

The rechargeable power supply 330 can be any appropriate rechargeable battery. Some IoT devices have corded power for normal operations, but a passive RF tag that is physically distinct may not have access.

II. Methods for Wirelessly Charging IoT Devices (FIG. 5)

Figure 5:
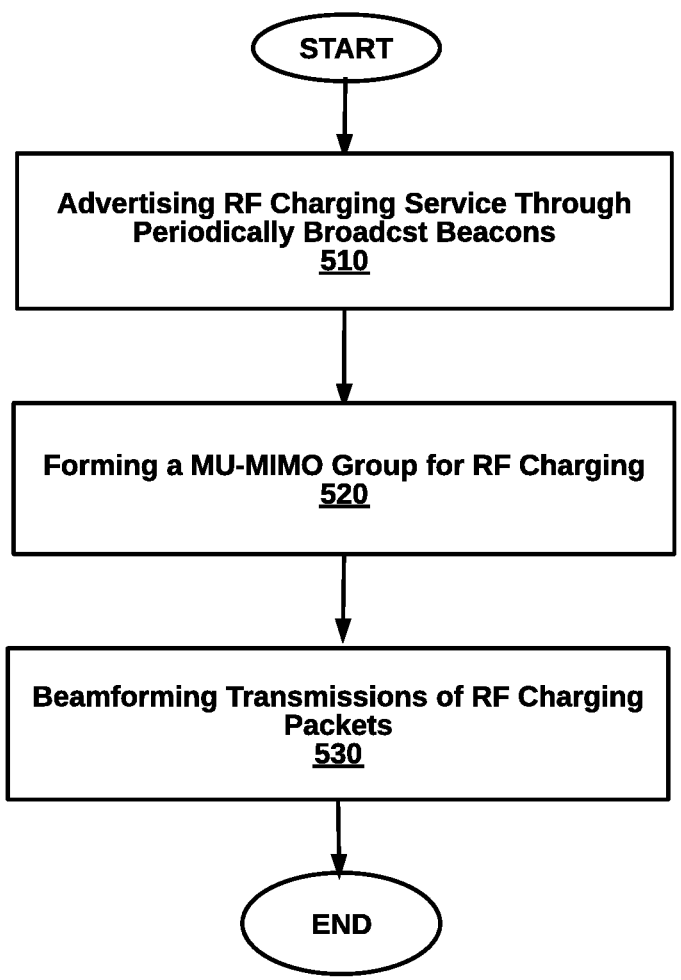
FIG. 5 is a high-level flow diagram illustrating a method for wirelessly charging IoT device, according to one embodiment.

FIG. 5 is a high-level flow diagram illustrating a method for wirelessly charging IoT device, according to one embodiment. One of ordinary skill in the art will recognize that the method 500 is non-limiting as other embodiments can have more or less steps and can be performed in a different order.

At step 510, RF charging service is advertised through periodically broadcast beacons. The beacons can be standard beacons, or be modified to include application layer data for IoT device applications.

At step 520, a MU-MIMO group is formed for RF charging. Other types of groups are also possible. IoT device can harvest energy without MU-MIMO capabilities, as the groups are mainly beneficial on the network side. Groups can be based on power characteristics, IoT characteristics, location proximity, RSSI measurements, and the like.

At step 530, RF packets are optionally transmitted using beamforming capabilities. Beamforming can increase the amount of power transferred due to signals being focused in a certain direction rather than all directions.

III. Generic Computing Device (FIG. 6)

FIG. 6 is a block diagram illustrating an exemplary computing device 600 for use in the system 60 of FIG. 1, according to one embodiment. The computing device 600 is an exemplary device that is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point of a data communication network, wirelessly charging wireless devices using RF (radio frequency) energy, the method comprising the steps of: operating in a data service mode for wireless stations including periodically transmitting, from a network interface of the access point, advertisement beacons for data service using a first BSSID (basic service set identifier); receiving, at the network interface of the access point, a mode change command from a Wi-Fi controller managing a plurality of access points; responsive to the mode change command, changing modes of the access point from the data service mode to an RF charging service mode utilizing a second BSSID dedicated to RF charging; operating in the RF charging service mode, including periodically transmitting, from the network interface, advertisement beacons for RF charging service through periodically broadcast beacons utilizing the second BSSID, wherein the RF charging service advertisement comprises information about changing channels, and a channel is selected based on having the least number of devices connected; forming, with a processor of the access point, a MU-MIMO (multiple input-multiple output) group from a plurality of wireless stations connected to the access point for RF charging, wherein the MU-MIMO group forming comprises receiving power characteristics for the plurality of wireless stations connecting to the access point, and forming the MU-MIMO group based on the power characteristics of the plurality of wireless stations; transmitting, at the network interface, RF packets to the plurality of wireless stations in the MU-MIMO group, each station including RF charging circuitry to harvest reusable energy from the RF packets; receiving, at the network interface of the access point, a mode change command from the Wi-Fi controller for changing modes from the RF charging service mode to the data service mode; and operating in the data service mode utilizing the first BSSID.

2. The method of claim 1, wherein the RF packets transmission comprises:
transmitting RF packets to stations using beamforming to focus a Wi-Fi signal to the Mu-MIMO group.

3. The method of claim 1, wherein the MU-MIMO group forming comprises:
receiving an indication of locations for stations connecting to the access point; and
forming the MU-MIMO group based on location proximity between stations.

4. The method of claim 1, wherein the RF charging service advertisement comprises:
beacons embedded with application layer information, wherein each station is executing an application for RF charging.

5. The method of claim 1, further comprising:
dedicating a radio of a plurality of radios on the access point for RF charging.

6. The method of claim 1, further comprising:
dedicating the access point for RF charging.

7. The method of claim 1, further comprising:
monitoring a power level of a station; and
responsive to the power level, modifying treatment of the station.

8. The method of claim 1, wherein the IoT device converts RF energy for storage in a rechargeable battery.

9. The method of claim 1, wherein the IoT device uses harvested RF energy from a Wi-Fi channel to power a wireless radio of a different type.

10. A non-transitory computer-readable medium that, when executed by a processor, performs a computer-implemented method, in an access point of a data communication network, wirelessly charging wireless devices using RF (radio frequency) energy, the method comprising the steps of: operating in a data service mode for wireless stations including periodically transmitting, from a network interface of the access point, advertisement beacons for data service using a first BSSID (basic service set identifier); receiving, at the network interface of the access point, a mode change command from a Wi-Fi controller managing a plurality of access points; responsive to the mode change command, changing modes of the access point from the data service mode to an RF charging service mode utilizing a second BSSID dedicated to RF charging; operating in the RF charging service mode, including periodically transmitting, from the network interface, advertisement beacons for RF charging service through periodically broadcast beacons utilizing the second BSSID, wherein the RF charging service advertisement comprises information about changing channels, and a channel is selected based on having the least number of devices connected; forming, with a processor of the access point, a MU-MIMO (multiple input-multiple output) group from a plurality of wireless stations connected to the access point for RF charging, wherein the MU-MIMO group forming comprises receiving power characteristics for the plurality of wireless stations connecting to the access point, and forming the MU-MIMO group based on the power characteristics of the plurality of wireless stations; transmitting, at the network interface, RF packets to the plurality of wireless stations in the MU-MIMO group, each station including RF charging circuitry to harvest reusable energy from the RF packets; receiving, at the network interface of the access point, a mode change command from the Wi-Fi controller for changing modes from the RF charging service mode to the data service mode; and operating in the data service mode utilizing the first BSSID.

* * * * *

UNITED STATES PATENT AND TRADEMARK OFFICE
CERTIFICATE OF CORRECTION

| | | |
|---|---|---|
| PATENT NO. | : 10,727,683 B2 | Page 1 of 1 |
| APPLICATION NO. | : 15/396657 | |
| DATED | : July 28, 2020 | |
| INVENTOR(S) | : Kaushik et al. | |

It is certified that error appears in the above-identified patent and that said Letters Patent is hereby corrected as shown below:

On the Title Page

Item (54) and in the Specification, Column 1, Line 1, the title should read:
WIRELESS CHARGING OF MULTIPLE WIRELESS DEVICES USING RF (RADIO FREQUENCY) ENERGY Signed and Sealed this
Twenty-second Day of September, 2020

Andrei Iancu
*Director of the United States Patent and Trademark Office*